United States Patent
Iwashimizu et al.

(10) Patent No.: US 12,379,187 B2
(45) Date of Patent: Aug. 5, 2025

(54) LASER IRRADIATION APPARATUS AND LASER IRRADIATION METHOD

(71) Applicants: MITSUBISHI HEAVY INDUSTRIES, LTD., Tokyo (JP); RIKEN, Saitama (JP); Institute for Laser Technology, Osaka (JP)

(72) Inventors: Masashi Iwashimizu, Tokyo (JP); Hiroyuki Daigo, Tokyo (JP); Shingo Nishikata, Tokyo (JP); Kazunori Masukawa, Tokyo (JP); Atsushi Ochiai, Tokyo (JP); Toshikazu Ebisuzaki, Saitama (JP); Satoshi Wada, Saitama (JP); Yoshiyuki Takizawa, Saitama (JP); Masayuki Maruyama, Saitama (JP); Shinji Motokoshi, Saitama (JP)

(73) Assignees: MITSUBISHI HEAVY INDUSTRIES, LTD., Tokyo (JP); RIKEN, Saitama (JP); INSTITUTE FOR LASER TECHNOLOGY, Osaka (JP)

( * ) Notice: Subject to any disclaimer, the term of this patent is extended or adjusted under 35 U.S.C. 154(b) by 939 days.

(21) Appl. No.: 17/258,817

(22) PCT Filed: Jul. 3, 2019

(86) PCT No.: PCT/JP2019/026481
§ 371 (c)(1),
(2) Date: Jan. 8, 2021

(87) PCT Pub. No.: WO2020/022012
PCT Pub. Date: Jan. 30, 2020

(65) Prior Publication Data
US 2021/0270568 A1    Sep. 2, 2021

(30) Foreign Application Priority Data
Jul. 24, 2018 (JP) .................. 2018-138536

(51) Int. Cl.
*F41G 3/08* (2006.01)
*F41G 3/14* (2006.01)

(52) U.S. Cl.
CPC .............. *F41G 3/08* (2013.01); *F41G 3/145* (2013.01)

(58) Field of Classification Search
CPC . F41G 3/08; F41G 3/145; G01S 17/66; G01S 13/589; G01S 13/723; G01S 13/867; G01S 17/86; G02B 26/06; F41H 13/005
See application file for complete search history.

(56) References Cited

U.S. PATENT DOCUMENTS

| | | | |
|---|---|---|---|
| 6,396,577 B1 * | 5/2002 | Ramstack | F41H 13/005 250/203.2 |
| 8,218,589 B1 * | 7/2012 | Saunders | G01S 17/66 372/33 |
| 2004/0069927 A1 * | 4/2004 | Billman | G02B 26/06 250/206.1 |

FOREIGN PATENT DOCUMENTS

| | | | |
|---|---|---|---|
| CN | 206354251 | * | 7/2017 |
| CN | 107765711 A | * | 3/2018 |

(Continued)

OTHER PUBLICATIONS

English translation of the International Preliminary Report on Patentability issued Feb. 4, 2021 in International Application No. PCT/JP2019/026481.

(Continued)

*Primary Examiner* — Catherine T. Rastovski
*Assistant Examiner* — Yossef Korang-Beheshti
(74) *Attorney, Agent, or Firm* — Wenderoth, Lind & Ponack, L.L.P.

(57) ABSTRACT

A laser irradiation apparatus includes a controller configured to calculate a predicted movement position into which a target is predicted to move at a future specific time, a transmission laser source configured to generate a transmission laser, irradiation optics configured to emit the transmission laser to the target and emit a search laser to the predicted movement position and wavefront correction optics. The wavefront correction optics are configured to correct a wavefront of the transmission laser at the future specific time based on observation light that returns when the search laser is emitted to the predicted movement position.

5 Claims, 4 Drawing Sheets

(56) References Cited

FOREIGN PATENT DOCUMENTS

| | | | |
|---|---|---|---|
| JP | 2011-185567 | | 9/2011 |
| JP | 2016-042550 | | 3/2016 |
| JP | 2016042550 A | * | 3/2016 |
| JP | 2017-157737 | | 9/2017 |
| WO | 2009/038843 | | 3/2009 |

OTHER PUBLICATIONS

International Search Report issued Aug. 13, 2019 in International (PCT) Application No. PCT/JP2019/026481.
AO System, Subaru Adaptive Optic System, https://www.subarutelescope.org/Introduction/instrument/AO.html, Subaru Telescope, NAOJ, Jan. 16, 2002.
Extended European Search Report issued Jul. 14, 2021 in corresponding European Patent Application No. 19841840.2.

* cited by examiner

LASER IRRADIATION APPARATUS AND LASER IRRADIATION METHOD

CROSS-REFERENCE TO RELATED APPLICATION

This application claims priority based on Japanese Patent Application No. 2018-138536 filed on Jul. 24, 2018, and all of the disclosure thereof is incorporated herein by reference.

TECHNICAL FIELD

The present invention relates to a laser irradiation apparatus and a laser irradiation method.

BACKGROUND ART

When a laser irradiation apparatus irradiates a laser to a target that exists far away, the laser is affected by atmospheric fluctuations. For example, when a wavefront of the laser is disturbed by atmospheric fluctuations, an optical path of the laser may be bent or diffused.

Correction of a wavefront of a laser is effective to reduce effects of atmospheric fluctuations (refer to Japanese Patent Publication No. 2011-185567). Such techniques are sometimes referred to as adaptive optics. Adaptive optics are disclosed at the Subaru Telescope (National Astronomical Observatory of Japan) website.

The target to which a laser is to be irradiated may move at high speed. It is desirable to reliably irradiate a target moving at high speed with a laser.

SUMMARY OF INVENTION

Therefore, an objective of the present invention is to provide techniques of reliably irradiating a target moving at high speed with a laser. Other objectives and new features of the present invention will be understood by skilled persons in the art from following disclosures.

From an aspect of the present invention, a laser irradiation apparatus is provided with a controller that calculates at least one predicted movement position into which a target is predicted to move at a specific time in future, a transmission laser source that generates a transmission laser, irradiation optics configured to emit the transmission laser to the target and emit search laser to the predicted movement position and wavefront correction optics configured to correct a wavefront of the transmission laser at the specific time based on observation light that returns when the search laser is emitted to the predicted movement position.

According to an embodiment, the laser irradiation apparatus may be further provided with a search laser source that generates the search laser and is provided separately from the transmission laser source. In such a configuration, the search laser generated by the search laser source can be emitted to the predicted movement position when the transmission laser generated by the transmission laser source is emitted to the target. In such an operation, it is preferable that the search laser has a wavelength different from the transmission laser.

In an embodiment, the search laser that generates the observation light used for a correction of a wavefront of the transmission laser at the specific time is irradiated to the predicted movement position before the specific time.

In an embodiment, a plurality of predicted movement positions is predicted. In this case, in an embodiment, the controller calculates wavefront correction data for each of the plurality of predicted movement positions based on observation light that returns when the search laser is emitted to each of the plurality of predicted movement positions, specifies a position of the target at the specific time based on observation information acquired by a target observer that observes the target and determines wavefront correction data to be actually used to correct the wavefront of the transmission laser at the specific time based on the specified position of the target and the wavefront correction data calculated for each of the plurality of predicted movement positions. In this case, the wavefront correction optics correct the wavefront of the transmission laser based on the determined wavefront correction data at the specific time.

In an embodiment, the laser irradiation apparatus is further provided with a meteorological meter that acquires meteorological information that indicates weather. In this case, the wavefront of the transmission laser may be corrected based on the meteorological information.

In another aspect of the present invention, a laser irradiation method includes calculating at least one predicted movement position into which a target is predicted to move at a specific time in future, emitting a search laser to the predicted movement position, emitting a transmission laser to the target and correcting a wavefront of the transmission laser at the specific time based on observation light that returns when the search laser is emitted to the predicted movement position.

In an embodiment, the search laser is emitted to the predicted movement position when the transmission laser is emitted to the target.

In an embodiment, a plurality of predicted movement positions is predicted. In this case, the correcting the wavefront of the transmission laser may include calculating wavefront correction data for each of the plurality of predicted movement position based on observation light that returns when the search laser is emitted to each of the plurality of predicted movement positions, observing the target and specifying a position of the target at the specific time, determining wavefront correction data to be actually used to correct the wavefront of the transmission laser at the specific time based on the specified position of the target and the wavefront correction data calculated for each of the plurality of predicted movement positions and correcting the wavefront of the transmission laser based on the determined wavefront correction data at the specific time.

According to the present invention, techniques of reliably irradiating a target moving at high speed with a laser will be provided.

DESCRIPTION OF EMBODIMENTS

Figure 1:
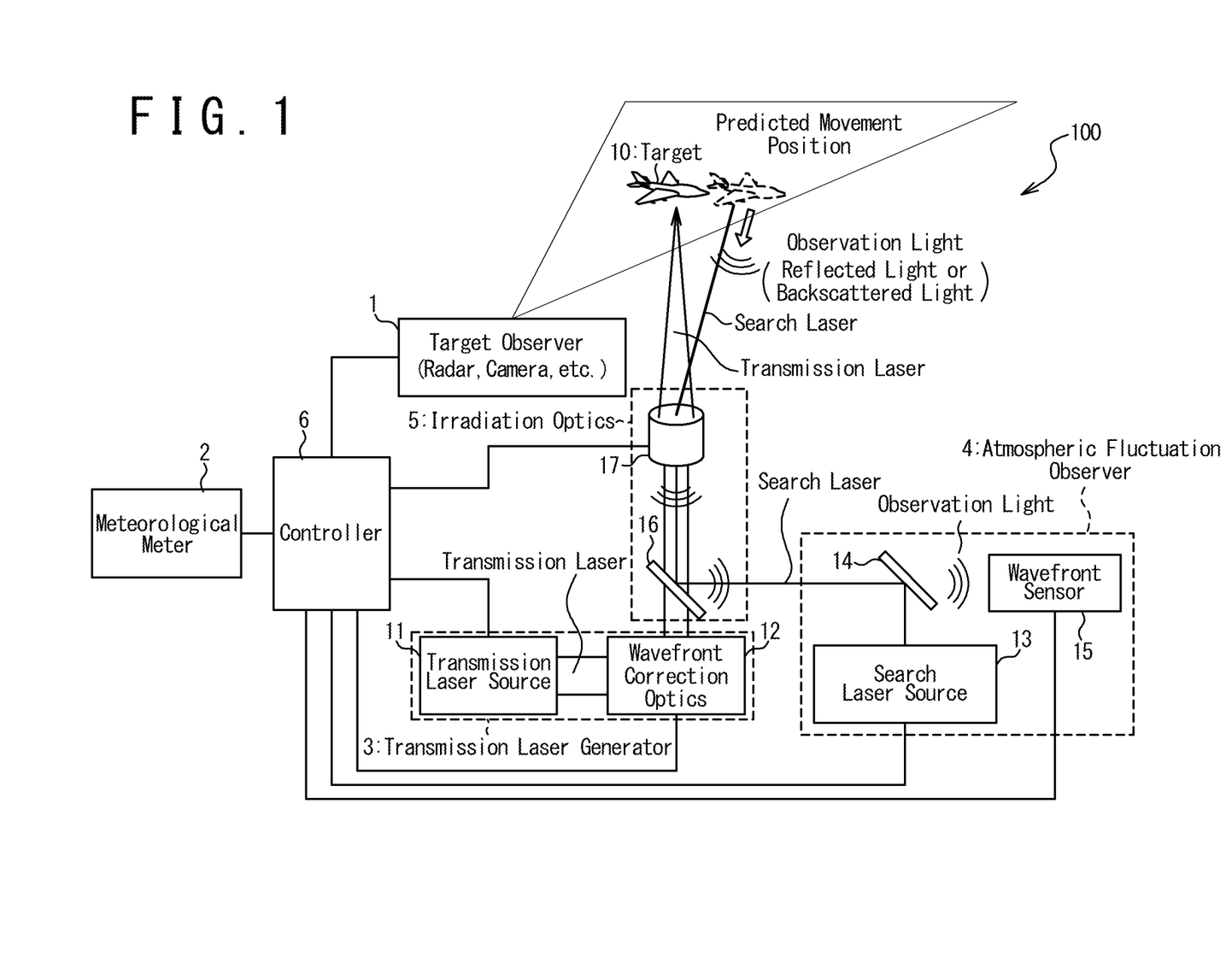
FIG. 1 is a block diagram that shows a configuration of a laser irradiation apparatus according to an embodiment.

FIG. 1 is a block diagram that shows a configuration of a laser irradiation apparatus 100 according to an embodiment. The laser irradiation apparatus 100 is configured to irradiate a transmission laser to a target 10. When the laser irradiation apparatus 100 is used to destroy the target 10, a high-power transmission laser may be irradiated to the target 10. In addition, when the laser irradiation apparatus 100 is used for an optical communication with the target 10, a transmission laser modulated based on communication data may be irradiated to the target 10.

The laser irradiation apparatus 100 according to the present embodiment is configured to appropriately a correct wavefront of the transmission laser based on a movement of the target 10. Specifically, the laser irradiation apparatus 100 predicts a predicted movement position that is a position into which the target 10 is predicted to move at a time $t_k$ in future and emits the search laser to the predicted movement position. The laser irradiation apparatus 100 acquires information of fluctuations of the atmosphere in an optical path between the laser irradiation apparatus 100 and the predicted movement position based on observation light that returns to the laser irradiation apparatus 100 when a search laser is emitted. As backscattered light is generated by light scattering in the atmosphere when a search laser is emitted to the predicted movement position, the backscattered light can be used as observation light. In addition, when a size of the target 10 is large enough and the search laser is reflected by the target 10, reflected light can be used as observation light. The laser irradiation apparatus 100 emits the transmission laser of which the wavefront is corrected based on information of the atmospheric fluctuation included in observation light to the target 10 at the time $t_k$. According to such operations, even if the target 10 is moving at high speed, the wavefront of the transmission laser can be appropriately corrected and a reliability of irradiating the transmission laser to the target 10 can be improved. Configurations and operations of the laser irradiation apparatus 100 will be described below in detail.

In the present embodiment, the laser irradiation apparatus 100 is provided with a target observer 1, a meteorological meter 2, a transmission laser generator 3, an atmospheric fluctuation observer 4, irradiation optics 5 and a controller 6.

The target observer 1 observes the target 10 that moves in the atmosphere and acquires observation information that indicates the movement of the target 10. The observation information may include, for example, a present position, a moving speed, a moving direction of the target 10. The target observer 1 may be provided with a radar, a camera, or the like.

The meteorological meter 2 acquires meteorological information that indicates weather. The meteorological information may include information that indicates, for example, wind speed, wind direction, air temperature and humidity.

The transmission laser generator 3 generates the transmission laser to irradiate the target 10 therewith. When a purpose of irradiating the transmission laser to the target 10 is to destroy the target 10, the transmission laser generator 3 is configured to be capable of generating a high-power transmission beam.

In the present embodiment, the transmission laser generator 3 is provided with a transmission laser source 11 and wavefront correction optics 12. The transmission laser source 11 is provided with a laser oscillator and generates the transmission laser. The wavefront correction optics 12 corrects the wavefront of the transmission laser received from the transmission laser source 11. The wavefront correction optics 12 is configured to correct the wavefront of the transmission laser based on wavefront correction data received from the controller 6. Herein, the wavefront correction data are data that indicate how the wavefront of the transmission laser should be corrected. The wavefront correction optics 12 may be provided with, for example, variable shape mirror of which a shape of a reflective surface is variable. In this case, the shape of the reflective surface of the variable shape mirror is controlled based on the wavefront correction data. The transmission laser of which the wavefront is corrected by the wavefront correction optics 12 is supplied to the irradiation optics 5.

The atmospheric fluctuation observer 4 is configured to generate the search laser used to observe the atmospheric fluctuation and observe atmospheric fluctuation based on observation light acquired from the atmosphere when the search laser is emitted from the irradiation optics 5. In the present embodiment, the atmospheric fluctuation observer 4 is provided with a search laser source 13, a half mirror 14 and a wavefront sensor 15. The search laser source 13 generates the search laser. The half mirror 14 reflects the generated search laser to supply it to the irradiation optics 5 and transmits the observation light received from the irradiation optics 5 to supply it to the wavefront Sensor 15. The wavefront sensor 15 detects the wavefront of the observation light and generates a wavefront sensor output that indicates a state of the wavefront of the observation light.

The irradiation optics 5 emits the transmission laser generated by the transmission laser generator 3 to the target 10. The irradiation optics 5 further emits the search laser generated by the atmospheric fluctuation observer 4 and emits the observation light, that is acquired from the atmosphere when the search laser is emitted, to the atmospheric fluctuation observer 4.

In the present embodiment, the irradiation optics 5 is provided with a half mirror 16 and a lens barrel 17. The half mirror 16 is configured to pass the transmission incident laser from the transmission laser generator 3 to make it enter the lens barrel 17. In addition, the half mirror 16 reflects the search laser incident from the atmospheric fluctuation observer 4 to make it enter the lens barrel 17, and reflects the observation light emitted from the lens barrel 17 to supply it to the atmospheric fluctuation observer 4. The lens barrel 17 is configured to emit the transmission laser and the search laser to a desired direction and to be capable of receiving observation light from the desired direction.

The controller 6 performs data processing necessary for irradiating the transmission laser to the target 10, and performs control of the entire laser irradiation apparatus 100. In an embodiment, the controller 6 operates as follows. At first, the controller 6 calculates the predicted movement position of the target 10 at a time in future based on the observation information acquired by the target observer 1. In addition, the controller 6 controls the search laser source 13 and the irradiation optics 5 so as to emit the search laser to the predicted movement position. Furthermore, the controller 6 generates wavefront correction data that is to be supplied to the wavefront correction optics 12 based on the wavefront sensor output that the wavefront sensor 15 outputs based on the observation light. The wavefront correction data may be generated based on meteorological information acquired by the meteorological meter 2, in addition to the wavefront sensor output. Furthermore, the controller 6 controls the transmission laser source 11 and the irradiation optics 5 so as to emit the transmission laser in a desired direction.

Figure 2:
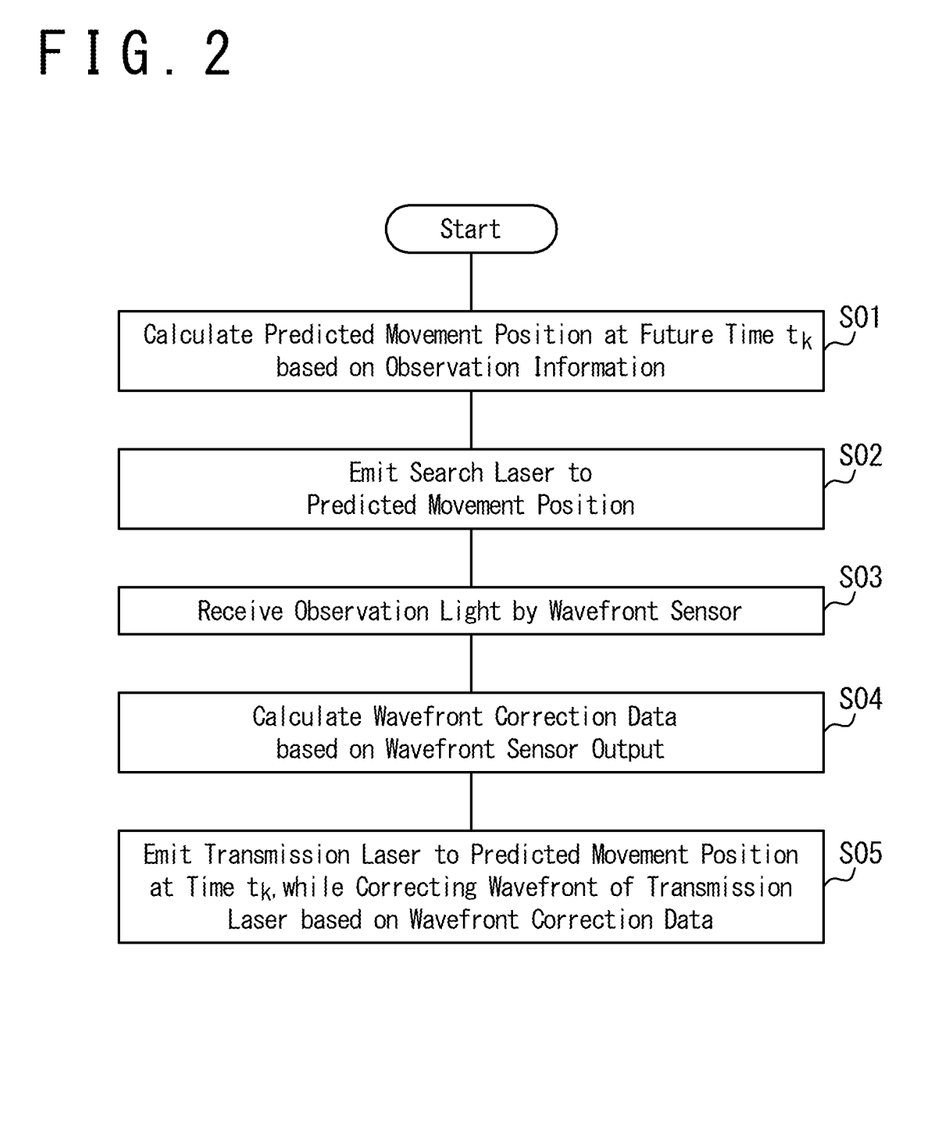
FIG. 2 is a flowchart that shows a procedure of an operation of a laser irradiation apparatus according to an embodiment.

FIG. 2 is a flowchart that indicates a procedure of an operation of the laser irradiation apparatus 100.

In a step S01, the controller 6 calculates a position into which a target 10 is predicted to move at a future time $t_k$, that is, a predicted movement position at the time to, based on observation information acquired by the target observer 1. When the target observer 1 includes a radar, the predicted movement position at the time $t_k$ may be calculated based on a present position, a moving speed and a moving direction of the target 10 that are acquired by the radar. In addition, when the target observer 1 includes a camera, a present position, a moving speed and a moving direction of the target 10 may be calculated from captured images that are acquired by the camera and the predicted movement position at the time $t_k$ may be calculated therefrom.

Then, in a step S02, a search laser is emitted to the predicted movement position. Under a control of the controller 6, the search laser is generated by the search laser source 13 and furthermore, the lens barrel 17 is operated so that the search laser is emitted to the predicted movement position.

In a step S03, observation light that returns to the lens barrel 17 while the search laser is emitted to the predicted movement position is received by the wavefront sensor 15. A wavefront sensor output based on a shape of the wavefront of the observation light is outputted by the wavefront sensor 15. As the wavefront of the observation light includes information of fluctuation of atmosphere between the laser irradiation apparatus 100 and the predicted movement position, the wavefront sensor output includes atmospheric fluctuation information.

In a step S04, wavefront correction data to be used to correct the wavefront at the time $t_k$ is calculated based on the wavefront sensor output that is outputted by the wavefront sensor 15. By referring the wavefront sensor output, the wavefront correction data based on the fluctuation of the atmosphere between the laser irradiation apparatus 100 and the predicted movement position can be calculated. The meteorological information acquired by the meteorological meter 2 may be referred to calculate the wavefront correction data. In an embodiment, the meteorological information is acquired as information indicating a status of the atmosphere such as information indicating wind speed, wind direction, air temperature and humidity. A time change of the atmospheric fluctuation may be predicted by the controller 6 based on the acquired meteorological information and the wavefront correction data may be calculated based on this prediction. By calculating the wavefront correction data based on meteorological information, an accuracy of the wavefront correction can be improved.

In a step S05, at the time $t_k$, the transmission laser is emitted to the target 10, while correcting the wavefront of the transmission laser based on the wavefront correction data calculated in the step S04. The time to start the irradiation of the transmission laser to the target 10 may be the time $t_k$ or may be before the time $t_k$. When the time to start the irradiation of the transmission laser to the target 10 is before the time $t_k$, the transmission laser is irradiated to the target 10 by tracking the target 10. In this case also, at least at the time $t_k$, the wavefront of the transmission laser is corrected based on the wavefront correction data calculated in the step S04.

Corrections of the wavefront of the transmission laser after the time $t_k$, at times $t_{k+1}, t_{k+2}, \ldots$, are also performed, similarly. Herein, an emission of the search laser for a correction of the wavefront of the transmission laser at the time $t_{k+1}$ may be carried out simultaneously to the emission of the transmission laser at the previous time $t_k$. Specifically, the transmission laser may be emitted at the time $t_1$ to the predicted movement position of the time $t_k$, and the search laser may be emitted to the predicted movement position of the time $t_{k+1}$. In the present embodiment, as the transmission laser and the search laser are separately generated by the transmission laser source 11 and the search laser source 13, respectively, the search laser can be emitted simultaneously to the emission of the transmission laser.

In an embodiment, the search laser may have a wavelength different from the wavelength of the transmission laser. As the search laser has a wavelength different from the wavelength of the transmission laser, the transmission laser and the search laser can be easily separated. For example, the lens barrel 17 may be configured to be capable of emitting the search laser to a direction different from the transmission laser by use of a difference of wavelengths, and the half mirror 16 may be configured to selectively supply the observation light to the atmospheric fluctuation observer 4 by use of the difference of wavelengths.

The laser irradiation apparatus 100 of the present embodiment has an advantage that the wavefront of the transmission laser related to a target 10 moving at high speed can be appropriately corrected. If a method according to a conventional adaptive optics is applied as it is, atmospheric fluctuation information will be acquired from reflected light generated by a reflection of the transmission laser on the target 10, and the wavefront of the transmission laser will be corrected based on this atmospheric fluctuation information. However, as in such a method a time rag from a time of acquiring the atmospheric fluctuation information to a time of actually carrying out the wavefront correction inevitably exists, an optical path in which the atmospheric fluctuation information is acquired and an optical path in which the transmission laser with the corrected wavefront is emitted will be different from each other due to the movement of the target 10. This decreases wavefront correction accuracy. On the other hand, the laser irradiation apparatus 100 of the present embodiment can appropriately correct the wavefront of the transmission laser, even if the target 10 is moving at high speed, because the optical path in which the atmospheric fluctuation information is acquired and the optical path in which the transmission laser with the corrected wavefront is emitted can be matched to each other.

In addition, the laser irradiation apparatus 100 of the present embodiment has an advantage that demands for response speed of each device included in the laser irradiation apparatus 100 can be relaxed. In an operation of the laser irradiation apparatus 100 of the present embodiment, a time grace from an emission of the search laser and a reception of observation light to an actual correction of the transmission laser wavefront can be ensured. This means that demands for response speed of each device included in the laser irradiation apparatus 100, specifically the wavefront sensor 15, the controller 6 and the wavefront correction optics 12, can be relaxed.

Figure 3:
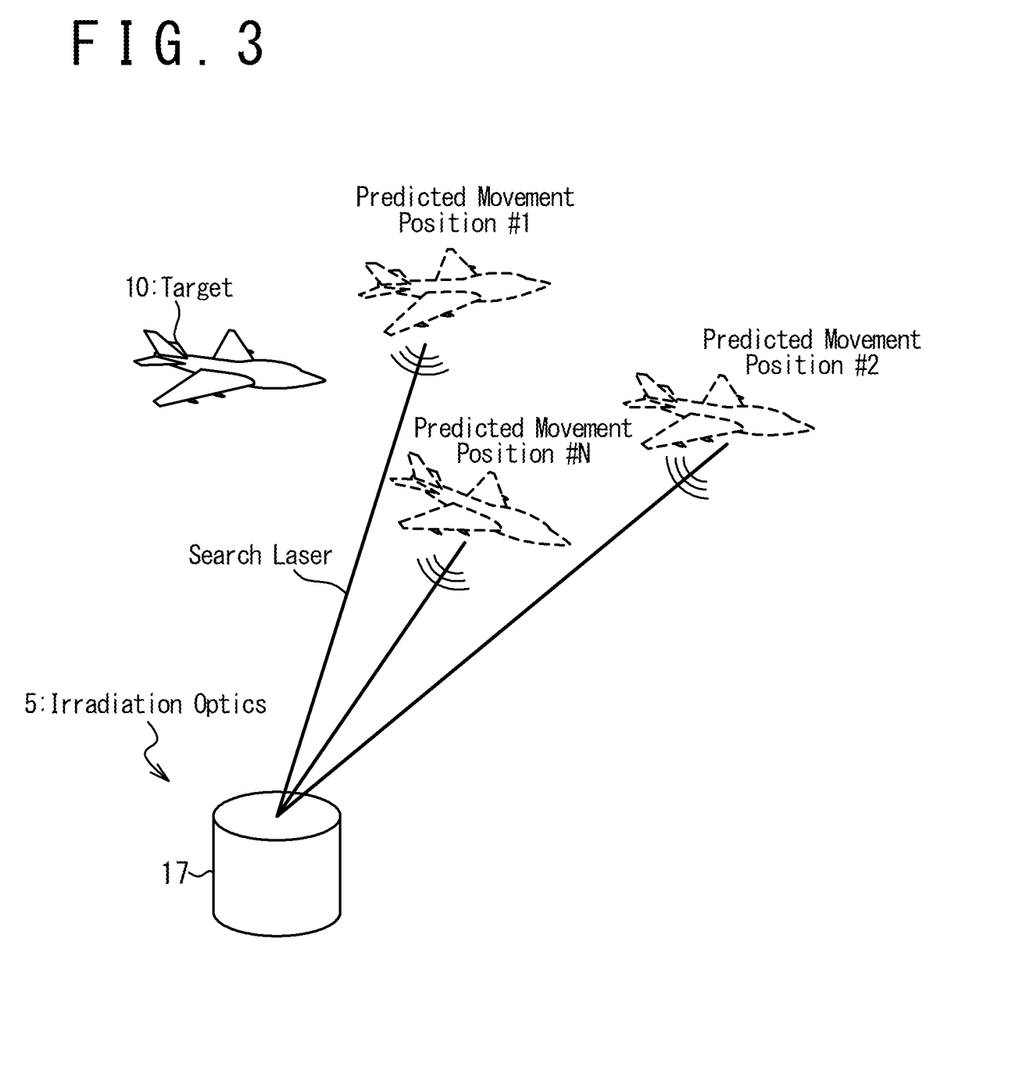
FIG. 3 is a diagram for explaining an operation of calculating a plurality of predicted movement positions.

As illustrated in FIG. 3, in the step S01, a plurality of predicted movement positions may be calculated and atmospheric fluctuation information can be acquired for each of them. FIG. 3 indicates an example in which N predicted movement positions #1 to #N are calculated. Herein, N is an integer equal to or larger than 2.

In this case, in the step S02, a search laser is emitted to each of the predicted movement positions #1 to #N, and furthermore, in the step S04, wavefront correction data are calculated for each of the predicted movement positions #1 to #N based observation light returned to the laser irradiation apparatus 100. Herein, wavefront correction data calculated for a predicted movement position #i are calculated based on observation light that returns when a search laser is emitted to the predicted movement position #i. Herein, i is an integer equal to or larger than 1 and equal to or less than N.

In the step S05, the position of the target 10 at the time t is specified based on observation information acquired by the target observer 1, and the wavefront correction data to be actually used for the correction of the wavefront is determined from the wavefront correction data calculated for each of the predicted movement positions #1 to #N based on the specified position of the target 10. In an embodiment, a predicted movement position that is closest to the position of the target 10 at the time $t_k$ may be selected among the predicted movement positions #1 to #N, and the wavefront correction data calculated for this predicted movement position may be used for the correction of the wavefront at the time $t_k$. In another embodiment, a plurality of predicted movement positions that are close to the position of the target 10 at the time $t_k$ may be selected and the wavefront correction data to be actually used for the correction of the wavefront may be calculated from an interpolation of the wavefront correction data calculated for this plurality of predicted movement positions.

By calculating the wavefront correction data in this way, the wavefront of the transmission laser can be appropriately corrected based on changes of movement direction or speed of the target 10.

Figure 4:
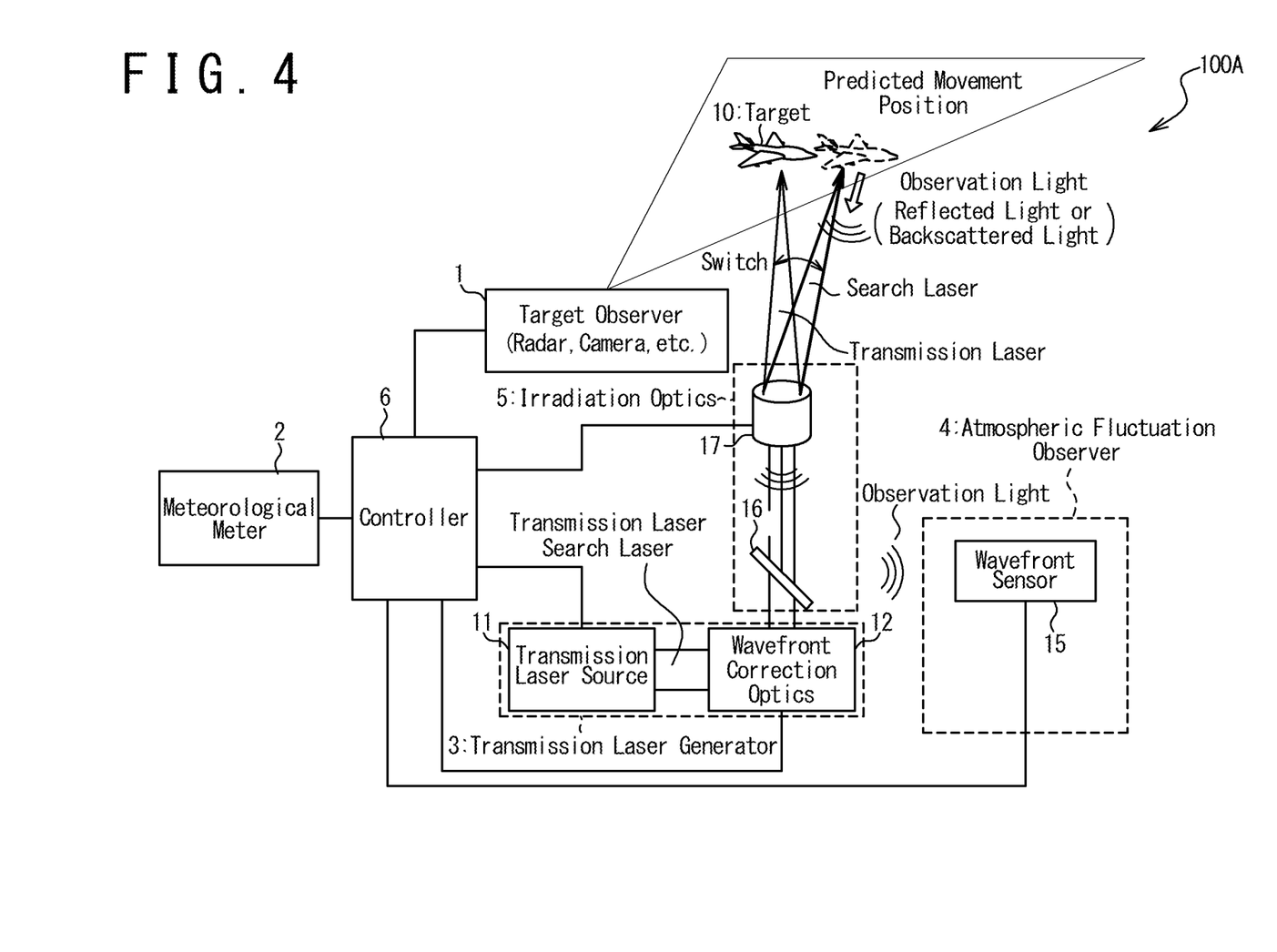
FIG. 4 is a block diagram that shows a configuration of a laser irradiation apparatus according to another embodiment.

FIG. 4 is a block diagram that shows a configuration of a laser irradiation apparatus 100A according to another embodiment. In the present embodiment, no search laser source 13 and no half mirror 14 are provided, and a search laser and a transmission laser with a same wavelength are generated by time division by the transmission laser source 11.

The laser irradiation apparatus 100A with the configuration in FIG. 4 also irradiates the transmission laser to the target 10 with a procedure similar to the procedure indicated in FIG. 2, except that the search laser and the transmission laser are generated by time division.

In the step S01, the predicted movement position at the time $t_k$ is calculated, and in the step S02, the search laser generated by the transmission laser is emitted to the predicted movement position. In the step S03, observation light that returns to the lens barrel 17 while the search laser is emitted to the predicted movement position is received by the wavefront sensor 15.

In the step S04, wavefront correction data to be used for the correction of the wavefront at the time $t_k$ is calculated based on the wavefront sensor output that is outputted by the wavefront sensor 15. In the step S05, at the time $t_k$, the transmission laser is emitted to the target 10 by correcting the wavefront of the transmission laser based on the wavefront correction data calculated in the step S04.

The configuration of the laser irradiation apparatus 100A in FIG. 4 requires no light source dedicated to generation of the search laser, and the scale of the apparatus can be reduced. The configuration in FIG. 4 is useful for a use in which a continued irradiation of the transmission laser to the target 10 is not required, such as an optical communication.

Although the embodiments of the present invention are disclosed above in detail, the present invention is not limited to the above described embodiments. It would be understood by skilled persons in the art that the present invention can be implemented with various modifications. In addition, it should be noted that the embodiments disclosed in the present description can be implemented as a combination as long as there is no technical contradiction.

The invention claimed is:

1. A laser irradiation apparatus comprising:
a target observer configured to observe a target and acquire observation information;
a controller configured to calculate predicted movement positions into which the target is predicted to move at respective future specific times;
a search laser source configured to generate a search laser;
a transmission laser source configured to generate a transmission laser, the transmission laser source being separate from the search laser source;
irradiation optics configured to emit the transmission laser to the target and emit the search laser to one of the predicted movement positions; and
wavefront correction optics configured to correct a wavefront of the transmission laser at one of the specific times based on observation light that is backscattered light generated by light scattering in an atmosphere and acquired from the atmosphere when the search laser is emitted to the one of the predicted movement positions, wherein the controller is configured to:
calculate wavefront correction data for each of the predicted movement positions based on observation light that returns when the search laser is emitted to each of the predicted movement positions;
specify a position of the target at the one of the specific times based on the observation information; and
determine wavefront correction data to actually be used to correct the wavefront of the transmission laser at the one of the specific times based on the specified position of the target and the wavefront correction data calculated for each of the predicted movement positions, and
wherein:
the wavefront correction optics are configured to correct the wavefront of the transmission laser based on the determined wavefront correction data at the one of the specific times; and
the search laser source is configured to, simultaneously with emission of the transmission laser to the target, emit the search laser to the one of the predicted movement positions at respective future specific times.

2. The laser irradiation apparatus according to claim 1, wherein a wavelength of the search laser is different from a wavelength of the transmission laser.

3. The laser irradiation apparatus according to claim 1, wherein:
the search laser is configured to generate the observation light used for correction of the wavefront of the transmission laser at the one of the specific times; and
the search laser source is configured to emit the search laser to the one of the predicted movement positions before the one of the specific times.

4. The laser irradiation apparatus according to claim 1, further comprising a meteorological meter configured to acquire meteorological information that indicates weather,
wherein the wavefront correction optics are configured to correct the wavefront of the transmission laser based on the meteorological information.

5. A laser irradiation method comprising:
calculating predicted movement positions into which a target is predicted to move at respective future specific times;
generating a search laser by a search laser source and emitting the search laser to one of the predicted movement positions;
generating a transmission laser by a transmission laser source and emitting the transmission laser to the target; and correcting a wavefront of the transmission laser at one of the specific times based on observation light that is backscattered light generated by light scattering in an atmosphere and acquired from the atmosphere when the search laser is emitted to the one of the predicted movement positions, wherein the correcting the wavefront of the transmission laser includes:

calculating wavefront correction data for each of the predicted movement positions based on observation light that returns when the search laser is emitted to each of the predicted movement positions;

observing the target and specifying a position of the target at the one of the specific times;

determining wavefront correction data to actually be used to correct the wavefront of the transmission laser at the one of the specific times based on the specified position of the target and the wavefront correction data calculated for each of the predicted movement positions; and correcting the wavefront of the transmission laser based on the determined wavefront correction data at the one of the specific times, wherein:

the transmission laser source is separate from the search laser source; and when the transmission laser is emitted to the target, the search laser is simultaneously emitted to the one of the predicted movement positions at respective future specific times.

* * * * *